United States Patent
Koctod

(10) Patent No.: US 8,137,578 B2
(45) Date of Patent: Mar. 20, 2012

(54) LEACHING RESISTANT PRE-WETTED DEICER COMPOSITION

(75) Inventor: Robert Scott Koctod, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 206 days.

(21) Appl. No.: 11/820,216

(22) Filed: Jun. 18, 2007

(65) Prior Publication Data

US 2008/0308764 A1 Dec. 18, 2008

(51) Int. Cl.
*C09K 3/18* (2006.01)

(52) U.S. Cl. ............................................ 252/70; 106/13

(58) Field of Classification Search ................ 252/70; 106/106
See application file for complete search history.

(56) References Cited

U.S. PATENT DOCUMENTS

| | | | | |
|---|---|---|---|---|
| 3,711,409 | A * | 1/1973 | Ayres et al. ................. | 252/70 |
| 4,016,301 | A * | 4/1977 | Theimer et al. ............. | 426/573 |
| 4,990,278 | A | 2/1991 | Wyeth et al. | |
| 5,039,439 | A | 8/1991 | Hansman et al. | |
| 5,135,674 | A | 8/1992 | Kuhajek et al. | |
| 5,531,931 | A | 7/1996 | Koefod et al. | |
| 5,843,330 | A | 12/1998 | Barbour et al. | |
| 5,849,356 | A * | 12/1998 | Gambino et al. ............ | 427/136 |
| 6,156,227 | A | 12/2000 | Koefod | |
| 6,299,793 | B1 | 10/2001 | Hartley et al. .............. | 252/70 |
| 6,398,979 | B2 | 6/2002 | Koefod et al. | |
| 6,800,217 | B2 | 10/2004 | Koefod et al. | |
| 7,147,797 | B2 | 12/2006 | Koefod et al. | |
| 7,294,285 | B2 | 11/2007 | Koefod et al. | |
| 7,306,749 | B2 | 12/2007 | Hartley et al. | |
| 2006/0124598 | A1 * | 6/2006 | Bessoles et al. ............. | 216/98 |
| 2006/0157670 | A1 | 7/2006 | Koefod | |

FOREIGN PATENT DOCUMENTS

| | | |
|---|---|---|
| CA | 2525983 | 5/2006 |
| EP | 0870813 | 10/1998 |
| GB | 1443838 | 7/1976 |
| JP | 60-195178 A | 10/1985 |
| JP | 63-314292 A | 12/1988 |
| JP | 4-370189 A | 12/1992 |
| RU | 2174995 | 10/2001 |
| WO | 01/64811 A2 | 9/2001 |
| WO | WO2007/051647 A1 * | 5/2007 |
| WO | 2007/117385 A1 | 10/2007 |

OTHER PUBLICATIONS

European Search Report, European Patent Office, European Application No. 08158519.2-1218, Oct. 15, 2008, 3 Pages.
PCT International Search Report PCT/US07/007807 mailed Aug. 31, 2007. 2 pages.
European Search Report, European Patent Office, European Application No. 07754341.1-1218, Mar. 9, 2009. 4 Pages.

* cited by examiner

*Primary Examiner* — Anthony Green

(57) ABSTRACT

A deicer comprises a mixture of a deicing agent, a pre-wetting agent, and a leaching inhibitor. The leaching inhibitor results in decreased liquid migration within and out of a mass of pre-wetted deicer. The deicer can include a deicing salt such as sodium chloride, a pre-wetting agent comprised of magnesium chloride, and a leaching inhibitor such as xanthan gum. The deicer can also include a corrosion inhibitor and/or radiation absorber.

7 Claims, No Drawings

LEACHING RESISTANT PRE-WETTED DEICER COMPOSITION

CROSS REFERENCE TO RELATED APPLICATIONS

The present application is related to U.S. patent application Ser. No. 11/729,991, filed on Mar. 29, 2007, which claims the benefit of U.S. Provisional Application Ser. No. 60/786,870, filed on Mar. 29, 2006, and which is also related to the U.S. patent application Ser. No. 11/270,323, filed Nov. 8, 2005, which claims the benefit of the U.S. Provisional Application Ser. No. 60/626,508, filed on Nov. 8, 2004. The U.S. patent application Ser. No. 11/729,991, U.S. Provisional Application Ser. No. 60/786,870, U.S. patent application Ser. No. 11/270,323 and U.S. Provisional Application No. 60/626,508 are incorporated herein by reference.

BACKGROUND

This disclosure relates to improved deicer compositions. More particularly, the disclosure relates to pre-wetted deicer compositions with reduced leaching properties.

Pre-wetted deicers are commonly used in winter road maintenance. Pre-wetted deicers can be applied to roads and other surfaces during winter months in areas where snow and/or ice tend to form on those surfaces after precipitation. Pre-wetted deicers typically consist of a solid deicer blended with a liquid deicer. The liquid deicer is sometimes sprayed onto the salt at the moment it is applied onto the road, but this requires special equipment. Thus, it is often desirable to pre-blend the liquid with the solid deicer so that the pre-wetted blend can be applied using the same, standard equipment and trucks used to apply dry salt to roads.

One of the challenges in producing pre-wetted deicers is leaching during storage. Leaching occurs when liquid migrates within, or flows out of, a mass of pre-wetted deicer. Environmental exposure can sometimes introduce additional moisture to pre-wetted deicers, pushing the deicers past their saturation point and resulting in leaching. Leaching is a nuisance that often requires site clean-ups. Leaching also produces inconsistent and non-uniform deicers, making them less effective, and has potential environmental impacts. There is thus a need to decrease leaching from pre-wetted deicers.

SUMMARY

The compositions and processes disclosed herein are aimed at providing an improved composition for pre-wetted deicers. According to an aspect of the present disclosure, a pre-wetted deicer comprises a mixture of a deicing agent, a pre-wetting agent, and a leaching inhibitor. The leaching inhibitor reduces the amount of pre-wetting agent that migrates within and flows out of a mass of pre-wetted deicer. The deicing agent can include a deicing salt such as sodium chloride, a pre-wetting agent such as aqueous magnesium chloride, and a leaching inhibitor such as xanthan gum. The deicer can also include a corrosion inhibitor and/or radiation absorber.

According to another aspect of the present disclosure, a liquid agent can be added to non-treated pre-wetted deicer or used directly in anti-icing or de-icing. The liquid agent contains a leaching inhibitor. When properly mixed with non-treated pre-wetted deicer, the liquid agent reduces the amount of pre-wetting agent that migrates within or flows out of a mass of pre-wetted deicer. The liquid agent can include an aqueous solution of magnesium chloride and a leaching inhibitor such as xanthan gum. The liquid agent can also include a corrosion inhibitor and/or radiation absorber.

According to another aspect of the present disclosure, a method of making a deicer includes mixing a deicing agent, a pre-wetting agent, and a leaching inhibitor. The pre-wetting agent and leaching inhibitor can be dissolved in a liquid which can then be blended with solid deicing salt, such as sodium chloride. A corrosion inhibitor and/or radiation absorber can additionally be mixed to create the deicer.

According to another aspect of the present disclosure, a method of making a liquid agent includes mixing a pre-wetting agent and a leaching inhibitor. The pre-wetting agent and leaching inhibitor can be dissolved in a liquid, such as an aqueous solution. A corrosion inhibitor and/or radiation absorber can additionally be mixed to create the liquid agent.

ILLUSTRATIVE EXAMPLES

Deicer Composition

According to an aspect of the present disclosure, a deicer comprises a mixture of a deicing agent, a pre-wetting agent, and a leaching inhibitor used to reduce the amount of pre-wetting agent that migrates within or flows out of a mass of deicer. In specific examples, concentrations of ingredients include between about 86 and about 99 percent by weight deicing agent, between about 1 and about 12 percent by weight pre-wetting agent, and between about 0.001 and about 2 percent by weight leaching inhibitor.

Deicing Agents

A variety of deicing agents can be used. Typically, a deicing agent is a substance having at least a component that, when combined with water or ice, forms a liquid that has a lower melting point than water. The deicer according to the present disclosure can include a solid deicing agent, such as sodium chloride, magnesium chloride, calcium chloride, urea, potassium acetate, calcium magnesium acetate, and other acetate salts, formate salts and combinations thereof.

In some specific examples, a deicing salt is used as a deicing agent. A deicing salt is typically a salt that, when combined with water or ice, forms a liquid that has a lower freezing point than water. For example, sodium chloride can form a solution with water in which the freezing point is lower than 0 degrees Celsius. Other deicing salts can also be used.

Magnesium chloride, when used as a deicing agent, can be derived from liquid bittern. As used herein, liquid bittern is a product derived from sea salt production, and is the liquid remaining after removal of sodium chloride from seawater. Liquid bittern normally contains water along with a high concentration of magnesium chloride and lower concentrations of other salts. In many compositions of the present disclosure, the liquid bittern contains between about 20 and about 35 percent by weight magnesium chloride. Liquid bittern containing other concentrations, such as less than about 20 percent by weight, magnesium chloride can also be used.

Pre-wetting Agents

Pre-wetting agents generally comprise an aqueous solution of a salt. The most common salts used to make pre-wetting agents include sodium chloride, magnesium chloride, calcium chloride, potassium acetate or calcium magnesium acetate. Pre-wetting agents are commonly added to the deicing agent to give it increased resistance to freezing, better deicing performance, and increased adhesion to the surface.

Leaching Inhibitors

Suitable leaching inhibitors include soy flour, dextrin, starch, gum Arabic, guar gum, xanthan gum, gum ghatti, gum karaya, locust bean gum, carageenan gum, sodium alginate, partially hydrolyzed polyacrylamide, bentonite, attapulgite, montmorillonite, hectorite, kaolin, and other viscosifying additives, such as viscosifying and thixotropic clays. Suitable viscosifying additives include clay, bentonite, attapulgite, montmorillonite, hectorite, kaolin or a combination thereof. Some examples of starch are corn starch and waxy maize starch. Suitable starches include those that are unmodified and modified, such as pregelatinized starch, crosslinked starch, or cold water swelling starch.

In certain compositions of the present disclosure, a deicer contains a pre-wetted deicer blended with a leaching inhibitor. The leaching inhibitor can be blended into the pre-wetted deicer in a solid form. In specific examples, the leaching inhibitor is dry xanthan gum. Other suitable leaching inhibitors can be used.

In specific compositions of the present disclosure, a deicing composition contains between about 80 and about 500 parts per million xanthan gum used as a leaching inhibitor. Other concentrations of xanthan gum can also be used, such as between about 40 and about 1000 parts per million or between about 10 and about 5000 parts per million.

Liquid Agents Containing Leaching Inhibitors

A liquid agent containing a pre-wetting agent and a leaching inhibitor can be blended with a solid deicing agent to create pre-wetted deicer with reduced leaching properties. The liquid agent can contain other ingredients such as corrosion inhibitors and radiation absorbers.

According to another aspect of the present disclosure, a liquid agent comprises an aqueous solution of a leaching inhibitor dispersed into between 10 and 60 percent by weight sodium chloride, calcium chloride, magnesium chloride, potassium acetate, or calcium magnesium acetate. Other liquids, including other aqueous solutions of chlorides and acetates, can also be used. The composition can optionally include a corrosion inhibitor and a radiation absorber.

In certain compositions of the present disclosure, a liquid agent contains a viscosifying leaching inhibitor dispersed into an aqueous solution of between about 10 and about 60 percent by weight sodium chloride, calcium chloride, magnesium chloride, potassium acetate, or calcium magnesium acetate. Specifically, a sufficient quantity of viscosifying leaching inhibitor is added to produce a liquid with viscosity between about 700 and about 2,500 centipoise at 25 degrees Celsius. Other quantities of viscosifying leaching inhibitor can also be used, producing liquid viscosities between about 500 and about 5,000 centipoise at 25 degrees Celsius or between about 300 and about 10,000 centipoise at 25 degrees Celsius.

In other illustrative compositions of the present disclosure, a liquid agent contains xanthan gum, a viscosifying leaching inhibitor, dispersed into an aqueous solution of between about 10 and about 60 percent by weight sodium chloride, calcium chloride, magnesium chloride, potassium acetate, or calcium magnesium acetate. Xanthan gum is a particularly efficient leaching inhibitor due to its ability to increase viscosity at very low additive levels. In some specific examples, the xanthan gum is dispersed at a level of between about 0.3 and about 0.5 percent by weight. Other concentrations of xanthan gum can also be used, such as between about 0.2 and about 0.8 percent by weight or between about 0.1 and about 1.0 percent by weight.

In other illustrative compositions of the present disclosure, a liquid agent contains between about 0.3 and about 0.5 percent by weight xanthan gum dispersed into an aqueous solution of between about 25 and about 33 percent by weight magnesium chloride. Other concentrations of xanthan gum can also be used, such as between about 0.2 and about 0.8 percent by weight or between about 0.1 and about 1.0 percent by weight. The composition can optionally include a corrosion inhibitor and a radiation absorber, such as dye. Between about 0.2 and about 2.0 percent by weight triethanolamine is suitable for use as a corrosion inhibitor and between about 0.05 and about 0.5 percent by weight Naphthol green B dye is a suitable for use as a radiation absorber.

Xanthan Gum

As noted above, xanthan gum can be used as a leaching inhibitor in a variety of ways. It is believed that leaching inhibition occurs with the addition of xanthan gum as the xanthan gum increases the viscosity of the liquid coating on the salt, inhibiting the liquid's ability to migrate within and flow out of the deicer pile. Dry xanthan gum can be directly blended with a pre-wetted deicer to inhibit leaching.

An alternative way to produce a pre-wetted deicer with reduced leaching properties is to pre-disperse xanthan gum into the pre-wetting liquid before it is blended with the deicing salt. This is possible because xanthan gum is readily dispersible into chloride brines. In many instances this will be a more efficient way to mix the deicer since it permits blending a single additive with the deicing salt rather than two separate additives. It can also be desirable in many instances because the low levels of xanthan gum required for effectiveness will be more efficiently and evenly distributed throughout the salt if the xanthan gum is first dispersed in the liquid solution.

OTHER COMPONENTS

Corrosion Inhibitors

The compositions discussed in the present disclosure can optionally include a corrosion inhibitor such as triethanolamine. Triethanolamine can be use as a corrosion inhibitor in accordance with the present disclosure. Other suitable corrosion inhibitors can be used, including phosphate salts, such as orthophosphates, polyphosphates, pyrophosphates, and organic phosphonates. Diammonium phosphate and monosodium phosphate are two specific examples of phosphate salts that can be used individually or together to provide corrosion inhibition. Calcium phosphates are also suitable for use as a corrosion inhibitor.

Radiation Absorbers

The compositions discussed in the present disclosure can optionally include a radiation absorber, such as a dye. Suitable radiation absorbing agents include chemicals with a high molar absorptivity in the infra-red, visible and/or ultraviolet portions of the spectrum and exhibit high quantum yields for internal conversion, thereby efficiently converting absorbed solar radiation to heat. Compounds of this type include certain dyes.

Naphthol Green B dye can be used as a radiation absorber in accordance with the present disclosure. Other suitable radiation absorbers can be used, including any agent capable of absorbing incident radiation and converting it to heat. An example of another radiation absorber is a black dye, such as Orcoform Black, available from Organic Dyestuffs Corporation, East Providence, Rhode Island.

In general, the radiation absorber, such as a dye, serves to increase the melting capacity of the deicer over using solid deicers alone by increasing the solar radiation absorption capability of the deicer. Thus, a radiation absorber having higher optical absorption coefficients than the deicing agent in a wide range in the solar radiation spectrum, including the ultraviolet radiation range, is preferable.

Other Ingredients

Other combinations of ingredients for deicers can be used in combination with leaching inhibitors to reduce liquid migration into or out of a mass of pre-wetted deicer. Examples of combinations of ingredients for deicers include those disclosed in the U.S. Pat. No. 6,156,227, which is co-owned with the present application and is incorporated herein by reference.

Method for Making Deicer

According to an aspect of the present disclosure, a method for making a deicer comprises mixing together a deicer, a pre-wetting agent, and a leaching inhibitor. In some specific examples, the deicer and the pre-wetting agent are first mixed to create a pre-wetted deicer and then the leaching inhibitor is mixed with the pre-wetted deicer. In other examples, the pre-wetting agent and the leaching inhibitor are first mixed together and then the mixture is mixed with the deicer to create a pre-wetted deicer with leach inhibiting properties. In addition, corrosion inhibitors and radiation absorbers can be added to the deicer.

In some specific examples, between about 80 and about 500 parts per million xanthan gum is blended with a pre-wetted deicer. Xanthan gum can be blended with the pre-wetted deicer at other levels as well, such as between about 40 and about 1000 parts per million or between about 10 and about 5000 parts per million.

Method for Making a Liquid Agent

According to an aspect of the present disclosure, a method for making a liquid agent comprises mixing together a pre-wetting agent and a leaching inhibitor. The composition can optionally include a corrosion inhibitor and a radiation absorber.

In some specific examples, between about 0.3 and about 0.5 percent xanthan gum is dispersed into an aqueous solution of between about 10 and about 60 percent by weight sodium chloride, calcium chloride, magnesium chloride, potassium acetate, or calcium magnesium acetate. Xanthan gum can be dispersed at other levels as well, such as between about 0.2 and about 0.8 percent or between about 0.1 and about 1.0 percent. Other liquids, including other aqueous solutions of chlorides and acetates, can also be used.

Experimental Demonstrations

Experiments were conducted using a variety of types of leaching inhibitors at different concentrations. The leaching tests were run by first preparing pre-wetted deicer samples from deicing salt conforming to ASTM D632, Type 1, Grade 2. Because the tendency to leach increases with the coarseness of the salt, in some instances fine salt was removed using a U.S. #30 sieve in order to exacerbate leaching.

The salt was then thoroughly blended with the equivalent of 7 or 8 gallons per ton of an aqueous solution containing 29 percent by weight magnesium chloride. 2,500 gram samples of the pre-wetted salt were blended with various leaching inhibitors. In some instances leaching inhibitors were dry blended with the pre-wetted salt product, and in some instances the leaching inhibitors were first dispersed into the liquid magnesium chloride so that the liquid and the leaching inhibitor could be blended with the salt as a single additive.

The samples were next placed in one gallon plastic bags which were left open. The open bags were placed in an environmental chamber maintained at constant temperature and humidity for a period of time. The bags were then removed from the chamber and 20 pinholes were poked in a bottom corner of each bag. Any free liquid was drained out of the punctured corner of each bag into a funnel on an Imhoff cone. After draining each bag for 24 to 48 hours, the volume of collected leach liquid was measured.

EXAMPLE 1

Samples were prepared from deicing salt conforming to ASTM D632, Type 1, Grade 2 and contained the equivalent of 7 gallons of 29 percent by weight magnesium chloride solution per ton plus the listed quantity of leaching inhibitor. The samples were placed in the environmental chamber maintained at 75 degrees Fahrenheit and 80 percent relative humidity. Table 1 shows leach volumes measured on a number of leaching inhibitors.

TABLE 1

Leaching of Pre-wetted Deicers Containing Leaching Inhibitors

| Leaching Inhibitor | Volume of Leach (mL) |
| --- | --- |
| None (control group) | 7.2 (average of 6 samples) |
| 0.80% 90 PDI soy flour | 0 |
| 0.15% pregelatinized corn starch | 0 |
| 0.10% corn starch | 0 |
| 0.03% carboxymethylcellulose | 0 |
| 0.06% gum ghatti | 0 |
| 0.03% gum karaya | 0 |
| 2.0% bentonite | 0 |
| 1.0% meat and bone meal | 0 |

Table 1 demonstrates that a variety of leaching inhibitors can be used to reduce leach to nominal levels.

EXAMPLE 2

Tests were run to determine the effectiveness of xanthan gum as a leaching inhibitor. Table 2 shows leach volumes of pre-wetted deicer blended with different amounts of xanthan gum at 80 percent relative humidity. Deicing salt was first blended with the equivalent of 7 gallons per ton of liquid magnesium chloride pre-wetting agent and then the mixture was thoroughly blended with the dry xanthan gum powder. The samples were exposed to 80 percent relative humidity and 75 degrees Fahrenheit for 48 hours and then allowed to drain for 48 hours.

TABLE 2

Leaching of Pre-wetted Salt Containing Xanthan Gum as a
Leaching Inhibitor (80% Relative Humidity)

| Leaching Inhibitor | Volume of Leach (mL) |
|---|---|
| None (control group) | 27 |
| 0.1% xanthan gum | 0.3 |
| 0.05% xanthan gum | 0 |
| 0.025% xanthan gum | 0 |

Table 2 demonstrates that xanthan gum can be blended as a dry additive to pre-wetted deicing salt to effectively inhibit leaching.

EXAMPLE 3

Tests were run to determine the effectiveness of xanthan gum as a leaching inhibitor at higher humidity. Because of the hygroscopic magnesium chloride treatment, moisture absorption will increase with increasing humidity and lead to exacerbated leaching. Table 3 shows leach volumes of pre-wetted deicer blended with different amounts of xanthan gum at 95 percent relative humidity. Deicing salt was first blended with the equivalent of 8 gallons per ton of liquid magnesium chloride pre-wetting agent and then the mixture was thoroughly blended with the dry xanthan gum powder. The samples were exposed to 95 percent relative humidity and 75 degrees Fahrenheit for 48 hours and then allowed to drain for 48 hours.

TABLE 3

Leaching of Pre-wetted Salt Containing Xanthan Gum as a
Leaching Inhibitor (95% Relative Humidity)

| Leaching Inhibitor | Volume of Leach (mL) |
|---|---|
| None (control group) | 130 |
| 0.025% xanthan gum | 35 |
| 0.04% xanthan gum | 23.5 |

Table 3 demonstrates that considerable leaching can occur at very high humidity, but that the addition of dry xanthan gum to pre-wetted deicer significantly reduces leaching even under these aggressive conditions. The addition of 250 parts per million xanthan gum reduced leaching by 73 percent compared to the control group. The addition of 400 parts per million xanthan gum proved even more successful, reducing leaching by 82 percent compared to the control group.

EXAMPLE 4

Samples were prepared from deicing salt in which finer grains of salt were removed using a U.S. #30 sieve and the coarser grains were then reblended in at a level of approximately 1 percent by weight to exacerbate the tendency to leach. Samples were exposed to 80 percent relative humidity and 75 degrees Fahrenheit for 6 days. Triplicate control samples containing 3.2 percent by weight liquid magnesium chloride pre-wetting agent and no leaching inhibitor showed 46, 57, and 12 mL leach after draining for 48 hours. Triplicate samples containing 3.2 percent by weight liquid magnesium chloride and 1.0 percent by weight clay slurry (28 percent clay in water) showed 11, 2, and 0 mL leach after draining for 48 hours. Thus, addition of the clay additive reduced leaching by 89 percent, from an average 38.3 mL leach in the control samples to 4.3 mL leach in the samples containing the clay additive.

EXAMPLE 5

Samples were again prepared from deicing salt in which finer grains of salt were removed using a U.S. #30 sieve and then the coarser grains were then re-blended in at a level of approximately 1 percent by weight to exacerbate the tendency to leach. Samples were exposed to 80 percent relative humidity and 75 degrees Fahrenheit for 5 days. Four replicate control samples containing the equivalent of 7 gallons per ton of liquid magnesium chloride and no leaching inhibitor showed 19, 9, 20, and 23 mL leach after draining for 48 hours. Four replicate samples containing the equivalent of 7 gallons per ton of liquid magnesium chloride and 0.35 percent by weight common, unrefined corn starch showed 0, 0, 0, and 0 mL leach after draining for 48 hours. Thus, addition of the starch additive reduced leaching by 100 percent, from an average of 17.8 mL leach in the control samples to no measurable leach in the samples containing the starch additive.

EXAMPLE 6

Tests were run to determine the effectiveness of different levels of xanthan gum as a leaching inhibitor when it was pre-dispersed in liquid magnesium chloride. Samples were again prepared from deicing salt in which finer grains of salt were removed using a U.S. #30 sieve and then the coarser grains were then re-blended in at a level of approximately 1 percent by weight to exacerbate the tendency to leach. Samples were blended with the equivalent of 8 gallons per ton of liquid magnesium chloride containing various levels of dispersed xanthan gum. Viscosities of the resulting magnesium chloride pre-wetting liquids were measured with a Brookfield Viscometer to determine the relationship between viscosity, xanthan gum level, and leaching tendency. Table 4 shows results of leaching tests on replicate samples exposed to 90 percent relative humidity and 75 degrees Fahrenheit for three days. Four replicates were run on each sample. Average measured leach volumes are given for each of the samples.

TABLE 4

Leaching of Deicing Salt Containing 8 Gallons/Ton Liquid Magnesium
Chloride Pre-Dispersed Xanthan Gum (90% Relative Humidity)

| Xanthan Gum Level | Liquid Viscosity (cPs) | Average Leach Volume |
|---|---|---|
| 0 (control group) | 30 | 117 |
| <0.1% | 65 | 78 |
| <0.1% | 220 | 75 |

The data in Table 4 shows results on samples containing very low levels of xanthan gum. Though there appears to be a small decrease in leaching tendency at liquid viscosities of 220 centipoise and lower, the effect is probably too small to be practically useful.

EXAMPLE 7

Tests were run with higher xanthan gum levels and higher viscosities. Table 5 shows results of samples exposed to 80 percent relative humidity and 75 degrees Fahrenheit for 6 or 9 days.

TABLE 5

Leaching of Deicing Salt Containing 8 Gallons/Ton Liquid Magnesium
Chloride Pre-Dispersed Xanthan Gum (80% Relative Humidity)

| Xanthan Gum Level | Liquid Viscosity (cPs) | Average Leach Volume |
|---|---|---|
| 0 (control group) | 30 | 64 (6 days exposure) |
| 0.15% | 350 | 18 (6 days exposure) |
| 0.25% | 720 | 14 (9 days exposure) |
| 0.35% | 1460 | 4 (9 days exposure) |
| 0.45% | 2350 | 1 (9 days exposure) |

Table 5 demonstrates that as the viscosity of the liquid rises, a more pronounced leaching inhibition effect is observed. The data shows that optimum leaching inhibition requires higher viscosities, preferably between about 1000 and about 2000 centipoise.

All patents and publication referred to above are incorporated herein by reference. The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above can be altered or modified and all such variations are considered within the scope and spirit of the present disclosure. Accordingly, the protection sought herein is as set forth in the claims below.

I claim:

1. A liquid deicer to be used for deicing, anti-icing, and deicer pre-wetting applied to roads and other surfaces, comprising a mixture of;

a leaching inhibitor, wherein the leaching inhibitor comprises xanthan gum and wherein the leaching inhibitor comprises an effective amount sufficient to produce a liquid agent having a viscosity between about 300 and about 10,000 centipoise at 25 degrees Celsius; and between about 10 and about 60 percent by weight of a pre-wetting agent, wherein the pre-wetting agent comprises an aqueous solution of sodium chloride, calcium chloride, magnesium chloride, potassium acetate, calcium magnesium acetate or a combination thereof.

2. The liquid deicer of claim 1, wherein the leaching inhibitor comprises between about 0.1 and about 1.0 percent by weight xanthan gum.

3. The liquid deicer of claim 1, wherein the leaching inhibitor comprises between about 0.2 and about 0.8 percent by weight xanthan gum.

4. The liquid deicer of claim 1, wherein the leaching inhibitor comprises between about 0.3 and about 0.5 percent by weight xanthan gum.

5. The liquid deicer of claim 1, comprising a mixture of:
   between about 25 and about 33 percent by weight magnesium chloride; and between about 0.1 and about 1.0 percent by weight xanthan gum.

6. The liquid deicer of claim 1, comprising a mixture of:
   between about 25 and about 33 percent by weight magnesium chloride; and between about 0.2 and about 0.8 percent by weight xanthan gum.

7. The liquid deicer of claim 1, comprising a mixture of:
   between about 25 and about 33 percent by weight magnesium chloride; and between about 0.3 and about 0.5 percent by weight xanthan gum.

* * * * *

UNITED STATES PATENT AND TRADEMARK OFFICE
CERTIFICATE OF CORRECTION

| | |
|---|---|
| PATENT NO. | : 8,137,578 B2 |
| APPLICATION NO. | : 11/820216 |
| DATED | : March 20, 2012 |
| INVENTOR(S) | : Robert Scott Koefod |

It is certified that error appears in the above-identified patent and that said Letters Patent is hereby corrected as shown below:

On the cover page, item (12), delete "Koctod" and insert --Koefod--.

On the cover page, item (75), delete "Koctod" and insert --Koefod--.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,137,578 B2 | Page 1 of 1 |
| APPLICATION NO. | : 11/820216 | |
| DATED | : March 20, 2012 | |
| INVENTOR(S) | : Koctod | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this

Seventh Day of August, 2012

David J. Kappos
*Director of the United States Patent and Trademark Office*